Dec. 4, 1951 C. F. ERN, JR 2,577,316
METHOD OF MANUFACTURING CUTTING TOOLS SUCH AS SCISSORS AND KNIVES
Filed Oct. 22, 1949 4 Sheets-Sheet 1
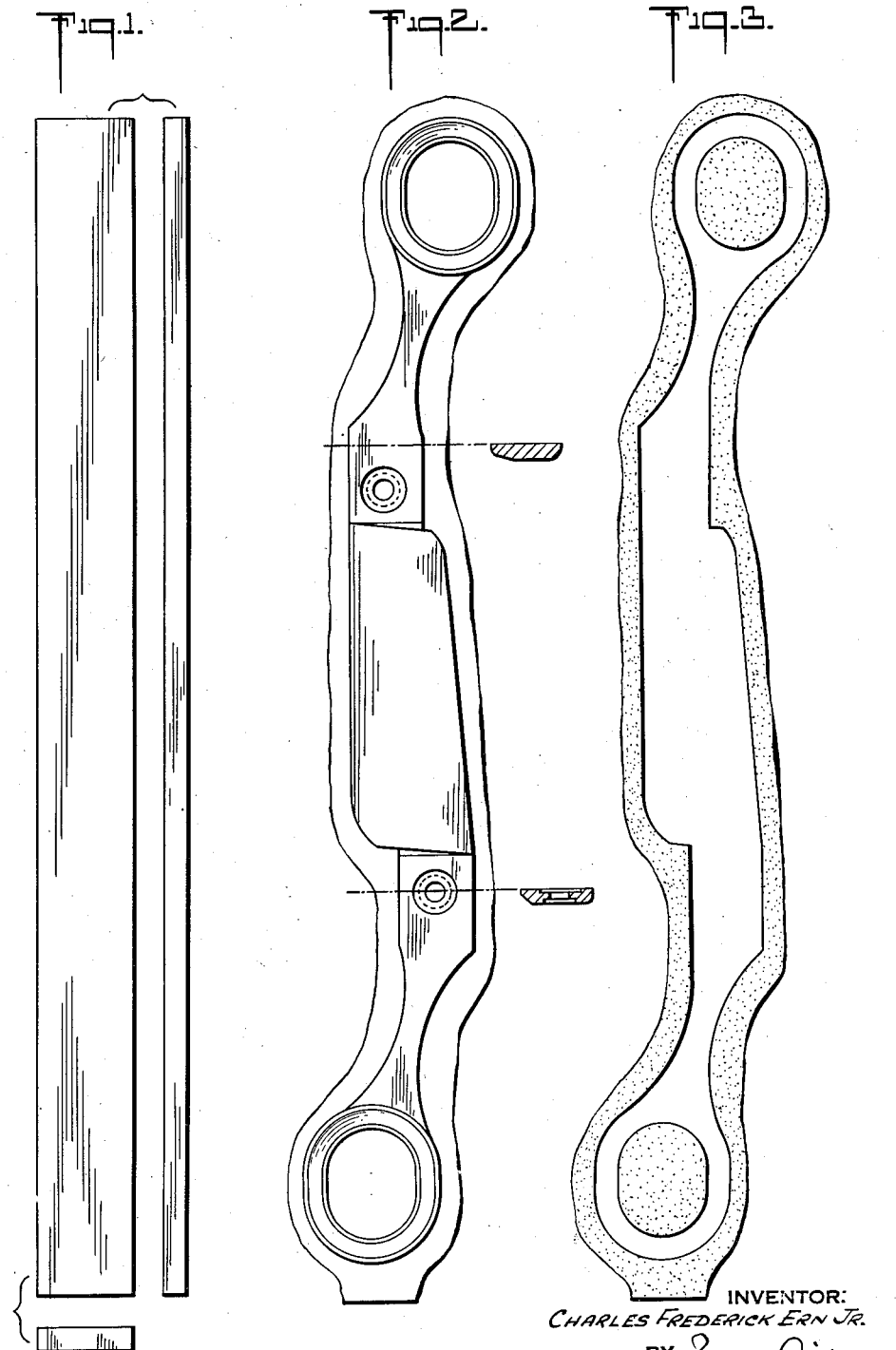
INVENTOR:
CHARLES FREDERICK ERN JR.
BY
ATTORNEY Dec. 4, 1951 C. F. ERN, JR 2,577,316
METHOD OF MANUFACTURING CUTTING TOOLS SUCH AS SCISSORS AND KNIVES
Filed Oct. 22, 1949 4 Sheets-Sheet 2
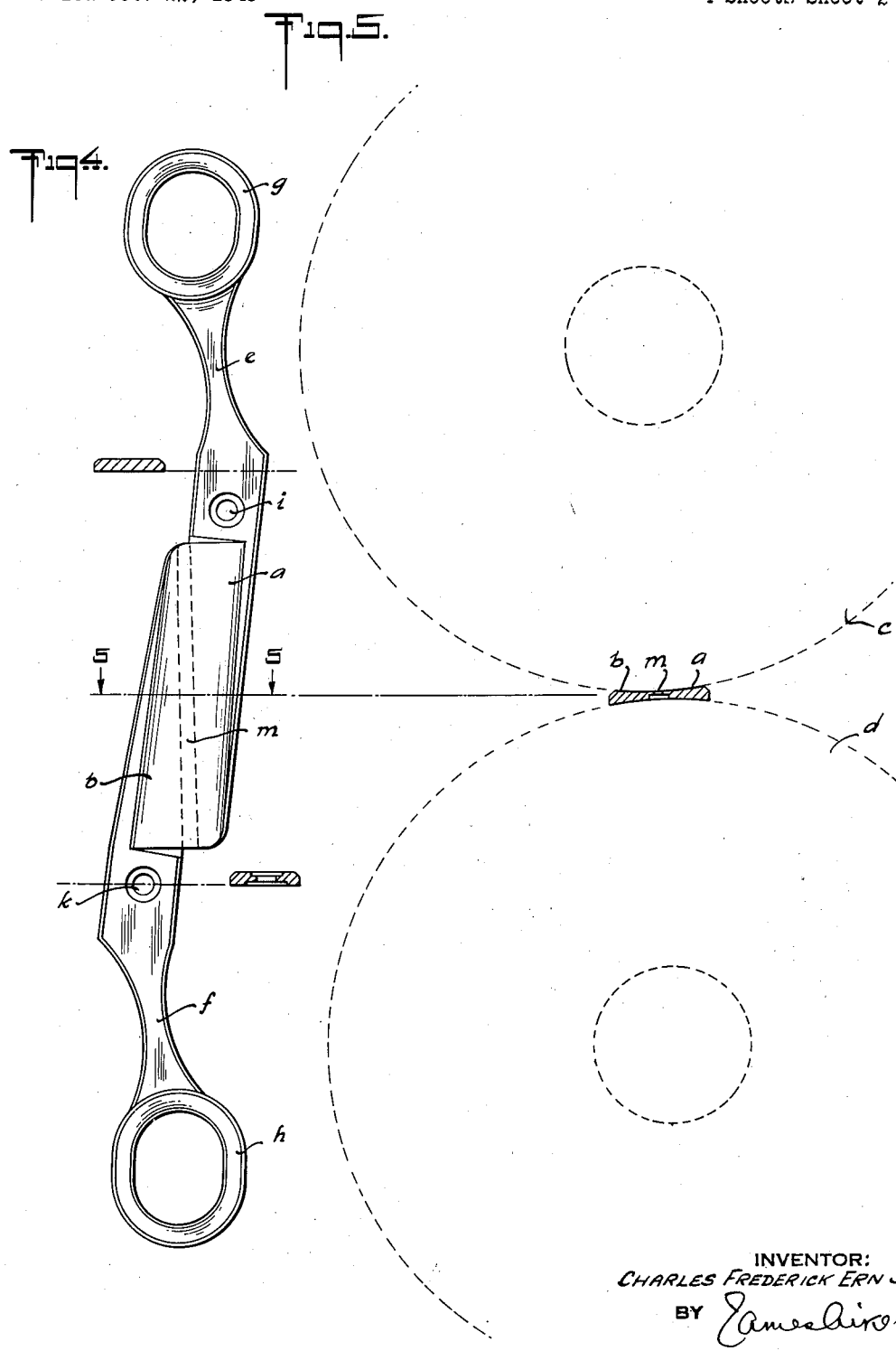
INVENTOR:
CHARLES FREDERICK ERN JR.
BY
ATTORNEY

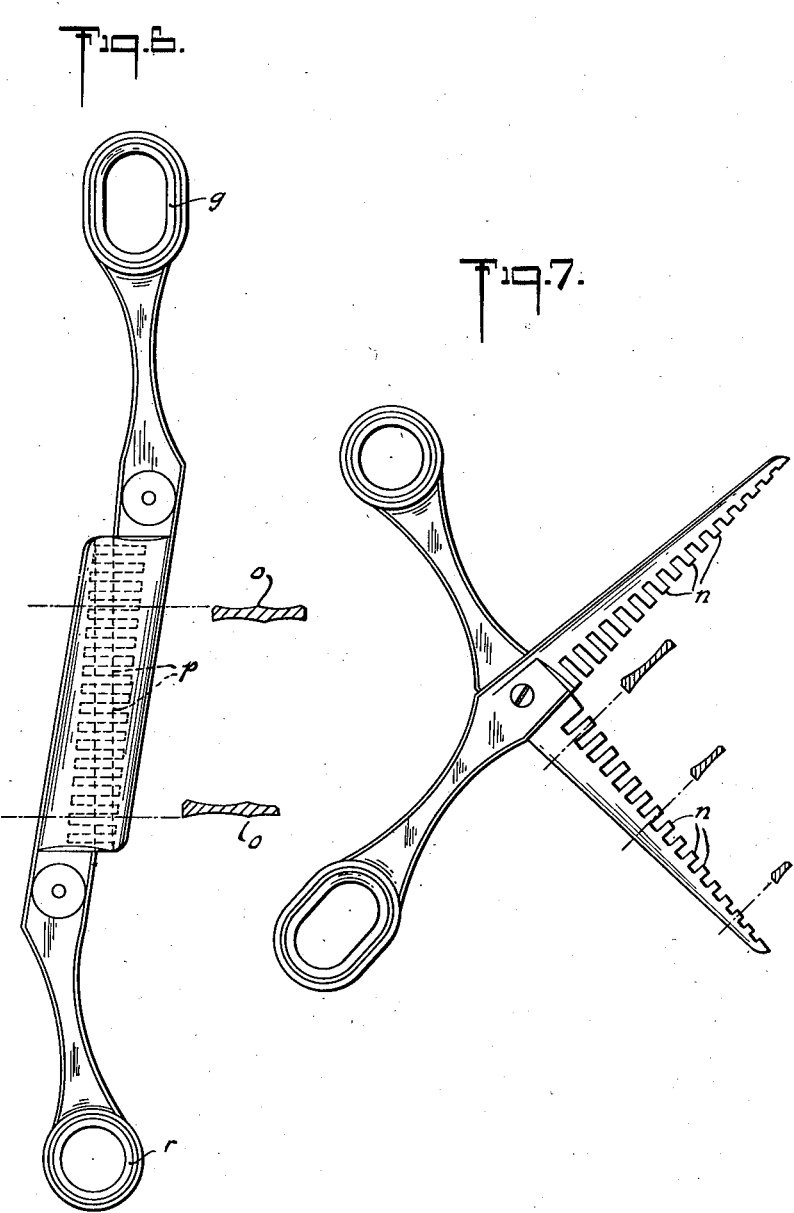

Dec. 4, 1951  C. F. ERN, JR  2,577,316
METHOD OF MANUFACTURING CUTTING TOOLS SUCH AS SCISSORS AND KNIVES
Filed Oct. 22, 1949  4 Sheets-Sheet 4
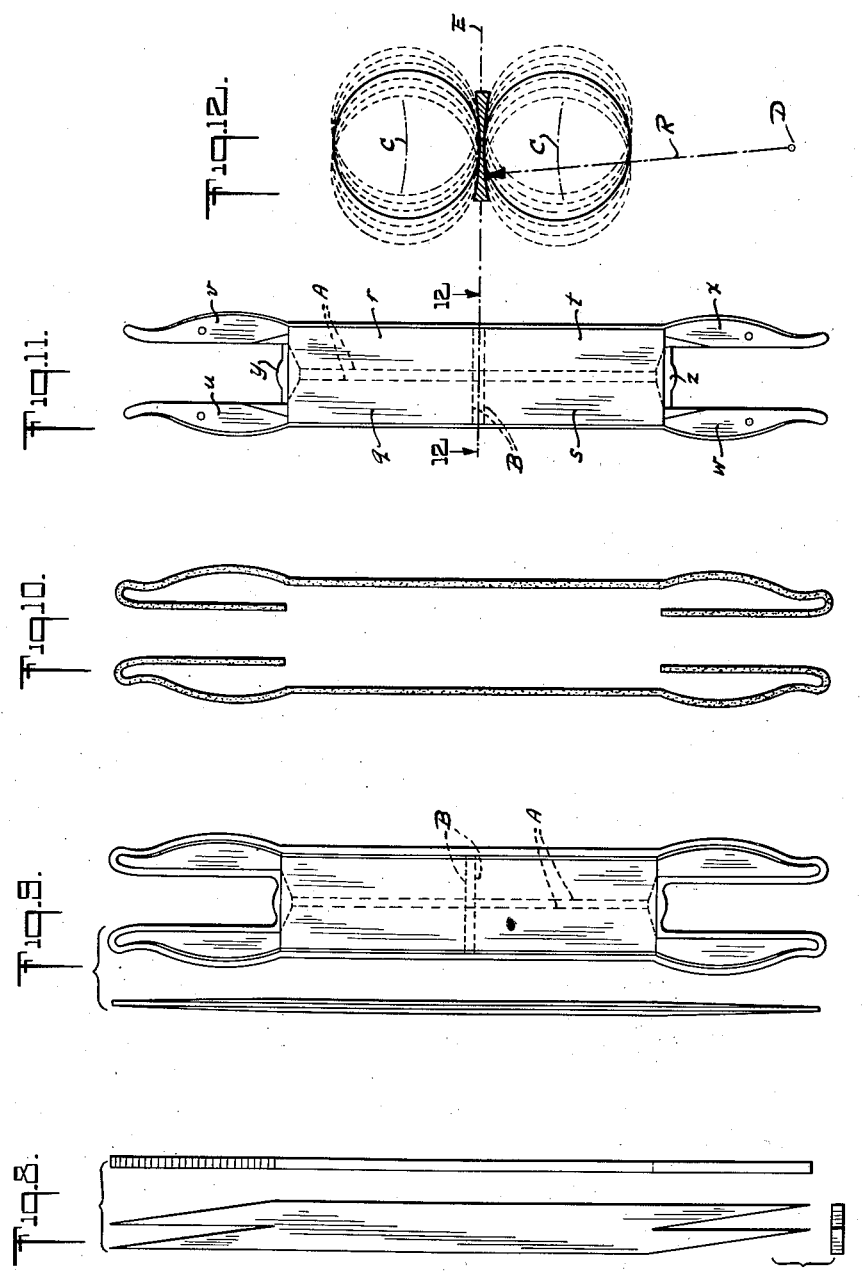
INVENTOR:
CHARLES FREDERICK ERN, JR.
BY
ATTORNEY Patented Dec. 4, 1951

2,577,316

UNITED STATES PATENT OFFICE 2,577,316

METHOD OF MANUFACTURING CUTTING TOOLS, SUCH AS SCISSORS AND KNIVES

Charles Frederick Ern, Jr., White Plains, N. Y.

Application October 22, 1949, Serial No. 122,914
In Germany August 24, 1949

5 Claims. (Cl. 76—101)

My invention relates to a method of manufacturing cutting tools such as scissors and knives.

It is the object of my invention to simplify the manufacture of such tools with a view to reducing the time consumption and the wastage of material thus minimizing the cost of manufacture.

To this end a blank incorporating the material for one or more pairs of scissor blades or knife blades cohering along their cutting edges is simultaneously operated upon on both of its faces by grinding wheels so as to produce concave surfaces thereon extending over the entire width of the blank. For producing cutting tools having straight cutting edges the blank is first subjected to a hardening treatment before it is subdivided to separate the individual blades from each other. For producing a thinning shear the blank, after having been ground, is subdivided prior to a hardening treatment and each blade so obtained is then machined to produce the teeth and is hardened, whereupon the teeth are ground.

Preferably, the blank is so shaped as to incorporate two complete scissor sections including the cohering blades and the associated handles and stems. This has the advantage that any desired shape may be chosen for all component parts irrespective of the mode of their subsequent assembly and that the component parts may be accurately machined in a simple manner ensuring a uniform quality of the material. After the blank has been given its approximate shape by a drop-forging operation, the blades, the handles and the stems are finished before the blank is cut apart to separate the individual sections from each other.

For the manufacture of knives a blank may be used incorporating the material for four blades so arranged that the edges of each of two pairs of blades cohere to one another. This method is particularly adapted for a manufacture of blades having a straight end face at the end opposite to the handle, such as razor blades of the customary design. The straight end faces are formed by subdividing the blank along a transverse central line, the handles being formed by the ends of the blank. While it has been proposed prior to the present invention to use a blank of the quadruplet type incorporating the material for four blades of table knives having a curved profile, the knives were so arranged as to cohere with their handles and backs. With this arrangement it is not possible to subject the blank to the grinding operation characteristic of the present invention.

My invention will now be described in detail with reference to the accompanying drawings in which a number of preferred embodiments are illustrated and the features of novelty will be pointed out in the claims.

Figs. 1 to 5 illustrate the manufacture of a pair of scissors,

Fig. 1 showing a rectangular blank of sheet metal incorporating the material for two complete scissor sections, Fig. 2 showing the blank shape by a drop-forging operation, Fig. 3 being a simplified reproduction of Fig. 2 indicating the trim-waste removed in a subsequent punching operation from the contour of the scissor sections and from the interior of the handles, Fig. 4 representing the blank after the trimming step, Fig. 5 showing a cross-section taken along line 5—5 of Fig. 4 indicating the position of the grinding discs, Figs. 6 and 7 show the manufacture of a thinning shear, Fig. 6 representing the blank in a condition similar to that of Fig. 4, and Fig. 7 depicting the finished shear, Figs. 8 to 12 illustrate the manufacture of razor blades, Fig. 8 showing a plan view, side view and end view of the blank in its first stage, Fig. 9 a plan view and side view of the blank after the drop-forging operation, Fig. 10 a simplified reprodutcion of the plan view of Fig. 9 indicating the waste removed in a trimming operation, Fig. 11 a plan view of the blank in its final stage, and Fig. 12 the section taken along line 12—12 of Fig. 11.

Figs. 1 to 3 are believed to be self-explanatory and, therefore, do not require any comment. In the stage illustrated in Fig. 4 the blank comprises a central portion incorporating the material for two scissor blades $a$ and $b$, and a thin intermediate bridge $m$, the central portion being integral with opposite stems $e$ and $f$ terminating in the handles $g$ and $h$. It will be noted that the prospective cutting edges indicated by the dotted lines are located adjacent to one another being connected by the bridge $m$.

According to an important feature of my invention the central portion of the blank comprising the elements $a$, $b$ and $m$ is subjected to a grinding operation. Preferably, two grinding wheels of the same size indicated in Fig. 5 by the dotted lines $c$ and $d$ act upon the two faces of the blank simultaneously so as to provide the blank with concave faces, each concave face extending the whole width of the blank.

Preferably, the blank shown in Fig. 4 is subjected to a hardening operation prior to the grinding step. In order to avoid a decarbonization and in order to reduce the oxydization to a minimum, the heating may be done by electrical induction.

It will be noted from Fig. 5 that the axes of the grinding wheels are parallel and that the curvature of the concave faces produced on the blank corresponds to the curvature of the periphery of the grinding wheels.

Following the grinding operation the stems $e$ and $f$, the handles $g$ and $h$ and the holes $i$ and $k$ are finished. Then the blank is in the condition for being cut apart. This operation may be performed by grinding away the bridge $m$ connecting the two blades $a$ and $b$ at the same time sharpening the cutting edges by producing edge faces of proper inclination, a conical grinding wheel being used for that purpose.

Generally speaking, the single blank may incorporate the material for two equal scissor sections or for two different scissor sections. It will be noted from Fig. 4 that the section $b$ has a pointed end whereas the section $a$ has a blunt end. At any rate, the grinding wheels must be properly adjusted depending on the location of the bridge $m$ connecting the two blades.

Grinding the blank by two grinding wheels engaging the blank over its entire width, as shown in Fig. 5, offers the advantage that the only feed motion required between the grinding wheels and the blank is the relative feed in direction of the depth. As, however, each size of scissors will have a different radius of curvature, a corresponding number of grinding wheels of different diameters must be kept in stock, such for instance as grinding wheels having a diameter of 8 inches for 8-inch scissors, wheels of a diameter of 7 inches for 7-inch scissors, wheels of 6½ inches for 6-inch scissors, etc. In order to be able to use grinding wheels of the same size for different jobs, a relative feed transversely of the blade along a curved path may be performed by each wheel. The curve path may be so chosen that a central strip coinciding with the bridge $m$, Figs. 4 and 5, or somewhat wider than the bridge $m$ will be plane or less curved than the outer portion of the blank faces. In this way a single pair of grinding wheels of a comparatively small size may be used for all jobs.

As a rule the relative feed transversely of the blank will be imparted to the blank itself although it is possible to hold the blank stationary and to impart both the transverse feed and the depth feed to the grinding wheels. In order to obtain the proper depth feed the distance of the two grinding wheels is suitably changed during the transverse feed motion.

Figs. 6 and 7 illustrate the manufacture of a thinning shear. Since the teeth $n$ thereof have rather thick ends as shown in the blade cross-sections in Fig. 7, a profile must be produced on the blank faces by the grinding operation different from that shown in Fig. 5. It will be noted from Fig. 6 that each face of the blank has a profile composed of two concave curves joining one another at a central crest indicated at $o$. The two crests of both faces register with one another and with the subdivision zone of the blank indicated by the two lines $p$ in Fig. 6.

In order to produce the configuration of the cross-sectional profile of the blank a pair of grinding wheels of a comparatively small diameter is employed acting first to the right of the crest $o$ and then to the left of said crest. Here again a relative feed motion both transversely of a blank and in the direction of the depth of the blank is required in order to produce the proper profile.

After the grinding operation, the blank is cut apart by means of a punching tool producing the toothed cutting edges typical of a thinning shear. The rectangular teeth which, as will appear from Fig. 7, are shorter near the ends of the blades are then milled, hardened and ground. In the hardening operation the teeth only are heated and chilled to avoid the risk of a distortion of the blades.

Figs. 8 to 12 illustrate the shaping and machining of a razor quadruplet.

Fig. 8 shows the blank in its original condition same being formed by a sheet metal strip having a pair of acute projections at each of its ends, the projections being formed by angular recesses.

In a drop-forging operation the blank is given the shape illustrated in Fig. 9. After the fin indicated in Fig. 10 by dots has been removed from the periphery of the blank, the latter is in condition for the grinding operation whereby the pairs of blades $q$, $r$, $s$, $t$ are provided with concave faces. The two ends of the blank are formed by the handles $u$, $v$, $w$, $x$. From a comparison of Figs. 9 and 10 it will appear that a small strip of the fin is left in place between the two handles, thus forming a reinforcing bridge $y$, or $z$ respectively, preventing a premature fracture of the blank in the course of the grinding operation in which the central bridge portion confined by the dotted lines A becomes very thin and, in the subsequent burnishing operation is nearly entirely worn away.

Finally, the transverse bridges $y$, $z$ and the central transverse bridge confined by the dotted lines B are ground away, the corners of the blades being rounded at the same time.

In Fig. 12 showing a cross-section of the blank of Fig. 11, I have indicated, how the grinding operation is performed by means of a pair of grinding wheels the axes of each wheel being fed along the dash-dotted arcuate paths C concentric to the centers D of the blade curvature. Owing to this arrangement a pair of grinding wheels of a comparatively small diameter may be used irrespective of the length of the radius R. Anybody skilled in the art will appreciate, of course, that the feed motion performed along the arcs C is a relative motion that may be produced by a transverse movement of the blank along line E and by a simultaneous adjustment of the two grinding wheels towards or away from one another.

The dotted lines A and B in Figs. 9 and 11 denote the contours of the finished product, it being understood that the strip of material confined between the two lines B is ground away to form plain straight end faces.

While I have described my invention with reference to a number of specific embodiments thereof, I wish it to be clearly understood that my invention is in no way limited to the specific features of such embodiments but is capable of numerous modifications within the scope of the appended claims.

What I claim is:

1. Method of manufacturing cutting tools having blades integral with handles comprising the steps of producing a sheet metal blank having a contour incorporating the material for at least one pair of cutting tools having their straight cutting edges positioned parallel and adjacent to and cohering with one another, forging said blank so as to shape the handles, simultaneously grinding each of the two faces of said blank to provide them with concave faces extending substantially the whole length of the blade-portion of said blank, the said grinding being effected by grinding discs rotating about axes extending in the longitudinal direction of the blades, and subdividing said blank so as to separate the individual cutting tools.

2. Method of manufacturing cutting tools of the kind having at least one blade integral with a handle comprising the steps of producing a blank incorporating the material for and having the contour of at least two adjoining blades cohering along their straight parallel cutting edges, simultaneously grinding the faces of the blade-section of said blank so as to produce concave profiles on said blank, the said grinding being effected by grinding discs rotating about axes substantially parallel to the longitudinal direction of the blades, hardening said blank, and subsequently subdividing said blank to separate said cutting tools from each other.

3. Method of manufacturing a thinning shear comprising the steps of producing a sheet metal blank having the contour of two adjoining shear sections cohering along their straight parallel cutting edges, simultaneously grinding the faces of the blade-section of said blank so as to produce concave profiles thereon, the said grinding being effected by grinding discs rotating about axes extending in the longitudinal direction of the blades subdividing said blank to separate said shear-sections to one another, machining said shear sections to provide the cutting edges thereof with teeth, hardening said teeth, grinding the latter, and assembling the two shear-sections.

4. Method of manufacturing a thinning shear comprising the steps of producing a blank having the contour of two adjoining shear sections cohering along their cutting edges, grinding the faces of the blade-portion of said blank to produce a profile on each face composed of two concave arcuate portions adjoining at a crest, the crests of the two face profiles being in substantial registry with one another and with the location of said cutting edges, subdividing said blank along said crest to separate said shear sections, providing the latter with teeth, hardening and grinding said teeth, and assembling the two shear sections.

5. Method of manufacturing knives having blades with straight cutting edges and blunt end faces comprising the steps of producing a blank incorporating the material for two longitudinally aligned pairs of blades cohering along their straight and parallel cutting edges and their end faces and for handles integral with said blades and located in pairs at opposite ends of the blank, simultaneously grinding the faces of the blade-section of said blank so as to produce a concave profile on each of said faces, the said grinding being effected by grinding discs rotating about axes extending in the longitudinal direction of the blades hardening said blank, and subsequently subdividing the latter longitudinally and transversely to separate the four knives from each other.

CHARLES FREDERICK ERN, Jr.

REFERENCES CITED

The following references are of record in the file of this patent:

UNITED STATES PATENTS

| Number | Name | Date |
| --- | --- | --- |
| Re. 3,138 | Baker | Sept. 29, 1868 |
| 54,813 | Baker | May 15, 1866 |
| 306,849 | Memmott | Oct. 21, 1884 |
| 1,565,340 | Treiber | Dec. 15, 1925 |
| 1,728,192 | Wellington | Sept. 17, 1929 |
| 1,917,353 | Bailey | July 11, 1933 |
| 2,002,812 | Hansen | May 28, 1935 |

FOREIGN PATENTS

| Number | Country | Date |
| --- | --- | --- |
| 3,248 | Germany | of 1878 |
| 171,017 | Great Britain | May 21, 1921 |
| 214,714 | Great Britain | Apr. 24, 1924 |
| 451,171 | Great Britain | July 30, 1936 |